(No Model.)
S. WILLIAMS.
CULINARY VESSEL.
No. 470,090. Patented Mar. 1, 1892.
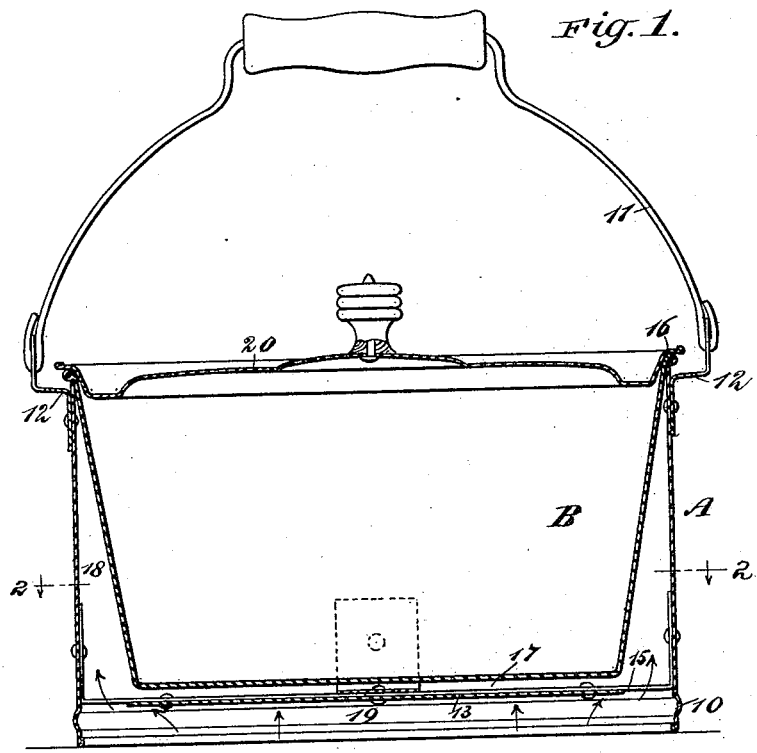
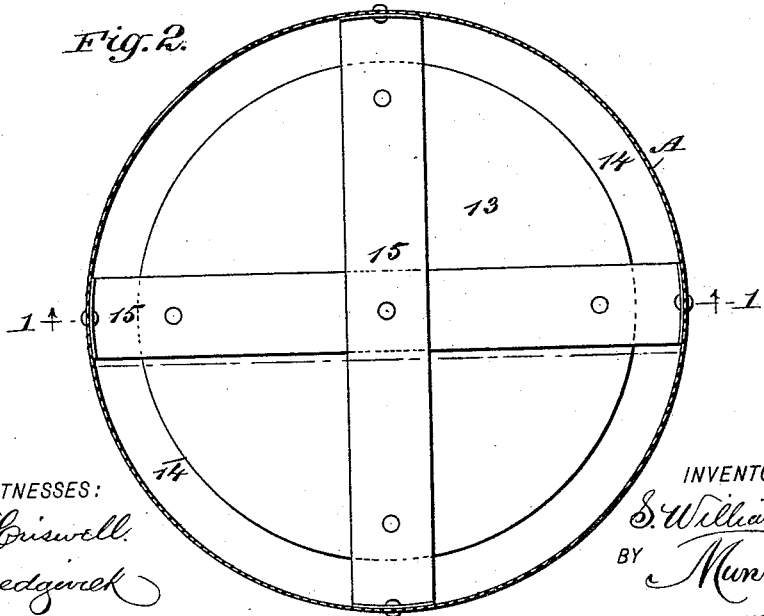
WITNESSES:
INVENTOR:
S. Williams
BY Munn & Co.
ATTORNEYS

UNITED STATES PATENT OFFICE.

SETH WILLIAMS, OF SING SING, NEW YORK, ASSIGNOR OF ONE-HALF TO WILLIAM W. SECOR, OF SAME PLACE.

CULINARY VESSEL.

SPECIFICATION forming part of Letters Patent No. 470,090, dated March 1, 1892.

Application filed July 21, 1891. Serial No. 400,227. (No model.)

*To all whom it may concern:*

Be it known that I, SETH WILLIAMS, of Sing Sing, in the county of Westchester and State of New York, have invented a new and useful Improvement in Culinary Vessels, of which the following is a full, clear, and exact description.

My invention relates to a culinary vessel of that class in which an inner vessel of earthenware, granite-ware, or other suitable material is inclosed in an outer metallic casing, band, or ring in such a manner as to form a space or chamber for the access of heat around and in contact with the walls of the inner vessel without the vessel being exposed to the direct action of the fire.

A further object of the invention is to provide a vessel of exceedingly simple, economic, and effective construction, and one in which the heat from the fire will be deflected and guided so as to impinge upon the interior vessel at the sides and bottom thereof.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a central vertical section through the vessel, the section being taken practically on the line 1 1 of Fig. 2; and Fig. 2 is a horizontal section taken practically on the line 2 2 of Fig. 1, looking in the direction of the arrows.

The outer casing-section A of the vessel is preferably cylindric or in the form of a band and is open at the top and at the bottom. The casing-section is preferably made of galvanized iron or the equivalent thereof and is provided, preferably near the bottom, with a circumferential reinforcing-rib 10. The casing-section is further provided with a bail or handle 11 of any suitable or approved construction, the said bail or handle being usually pivotally attached to ears 12, secured to the outer surface of the casing-section, as is best shown in Fig. 1. Within the casing-section, above the reinforcing-rib 10, a disk 13 is held in suspension. The disk is of less diameter than the diameter of the casing-section, whereby a space 14 intervenes the inner wall of the casing-section and the periphery of the disk.

In order to make the vessel as economic in construction as possible and yet maintain durability, the disk is held in suspension through the medium of a spider 15 or the equivalent thereof, the said spider being secured to the disk at its body portion and at its ends to the inner walls of the casing, as is best shown in Fig. 2.

The interior section B of the vessel is a receptacle, preferably in the form of an inverted frustum of a cone, and the said receptacle is adapted to contain the food or material to be cooked or warmed and at its upper end is flanged outward and supported within the casing by this flange 16, resting upon the top edge of the casing, as is shown in Fig. 1. The depth of the receptacle B is less than the depth of the casing-section between its disk 13 and its upper end. Thus a compartment 17 is obtained between the disk and the bottom of the receptacle. The bottom of the receptacle is practically of a diameter equal to the diameter of the disk, or nearly so, and as the receptacle B has tapering sides and the sides of the casing-section are straight an annular chamber 18 is formed around the outer side of the receptacle. When the receptacle is thus placed over the fire, the products of combustion and the heat radiating therefrom enters the lower chamber 19 in the vessel beneath the disk 13 and impinges upon the latter, and in so doing it is directed or deflected in such a manner that the heat passes up through the space 14 in direct engagement with the entire outer side surface of the receptacle B, and as a counter-draft is created the bottom of the receptacle not only receives heat from the hot disk and heated air between the disk and the bottom, but also receives heat by continuous currents of fresh hot air emanating from the fire and circulating from side to side of the casing. This action is obtained, principally, by elevating the receptacle B above the disk 13 and by causing the diameter of the disk to closely approximate the diameter of the bottom of the receptacle, thereby forming an unobstructed and direct passage of heated air from the lower compartment of the casing to the upper compartment 18. The inner receptacle B may be covered, and preferably is covered, by a lid 20 of any approved construction.

Having thus described my invention, I claim as new and desire to secure by Letters Patent—

1. As an improved article of manufacture, a culinary vessel comprising an outer casing having practically straight walls and open at its top and bottom, a disk supported horizontally within the casing a short distance from the bottom thereof, the said disk being of less diameter than the diameter of the casing, forming thereby an annular space or opening, and a receptacle having downwardly-flaring sides and suspended from the upper edge of the casing-section, so as to close the top of the same, the bottom of the said inner receptacle being about the same diameter as that of the said disk and held above and spaced some distance from the said disk, as and for the purpose specified.

2. A culinary receptacle comprising a casing having practically straight sides and open at its top and bottom, a spider located within the casing a short distance from its bottom and attached to its sides, and a disk secured to the center of the spider, said disk being held in a horizontal position and being of a diameter less than the diameter of the casing, creating thereby an annular space or opening between its periphery and the inner face of the casing, and a receptacle adapted to receive material to be cooked and having downwardly and inwardly flaring sides and provided with a flange at its top for suspending it within the casing above the disk, the bottom of the receptacle being of a diameter about the same as that of the said disk, as and for the purpose specified.

SETH WILLIAMS.

Witnesses:
FRANKLIN J. WASHBURN,
WILLIAM W. SECOR.